United States Patent [19]
Uozumi et al.

[11] Patent Number: 4,808,492
[45] Date of Patent: Feb. 28, 1989

[54] FUEL CELL USING LIQUID ELECTROLYTE

[75] Inventors: Norihira Uozumi; Koji Amakawa; Yoshiyuki Kubota, all of Hitachi; Atsushi Miki, Katsuta; Yasuyuki Tsutsumi, Hitachi, all of Japan

[73] Assignee: Hitachi, Ltd., Tokyo, Japan

[21] Appl. No.: 130,185

[22] Filed: Dec. 8, 1987

[30] Foreign Application Priority Data

Dec. 10, 1986 [JP] Japan ................ 61-292313

[51] Int. Cl.⁴ .................................. H01H 8/08
[52] U.S. Cl. ........................ 429/34; 429/39; 429/41; 429/46
[58] Field of Search ............ 429/34, 38, 39, 41, 429/14, 40, 12, 46

[56] References Cited

U.S. PATENT DOCUMENTS

| | | | |
|---|---|---|---|
| 3,615,845 | 10/1971 | Gray | 429/34 |
| 4,035,551 | 7/1977 | Grevstad | 429/41 X |
| 4,345,008 | 8/1982 | Breault | 429/34 X |
| 4,407,904 | 10/1983 | Uozumi et al. | 429/39 X |
| 4,572,876 | 2/1986 | Spurrier | 429/39 X |

*Primary Examiner*—Anthony Skapars
*Attorney, Agent, or Firm*—Antonelli, Terry & Wands

[57] ABSTRACT

An electrolyte-type fuel cell, i.e., a fuel cell using a liquid electrolyte, which comprises at least one unit cell comprising a matrix for retaining a liquid electrolyte and a pair of gas diffusible electrodes each having a gas flow passage and provided at both sides of the matrix and in direct contact with the matrix, and a pair of gas supply-discharge means for supplying and discharging a necessary gas to and from the gas passages of the corresponding gas-diffusible electrodes of the unit cell, at least one of the gas passages of the gas-diffusible electrodes being communicated with the matrix through at least one liquid electrolyte passage, at least one demister being provided in the gas flow passage and on the liquid electrolyte passage exposed in the gas flow passage, and a means for generating electrolyte mists being provided at the supplying side of at least one of the gas supply-discharge means can supply a liquid electrolyte to the matrix with a high trapping efficiency of liquid electrolyte mists.

44 Claims, 5 Drawing Sheets

FUEL CELL USING LIQUID ELECTROLYTE

BACKGROUND OF THE INVENTION

This invention relates to a fuel cell using a liquid electrolyte, i.e. an electrolyte-type fuel cell, having a suitable system for supplying a liquid electrolyte to the fuel cell, and particularly to a phosphoric acid-type fuel cell using phosphoric acid as an electrolyte.

In an electrolyte-type fuel cell which comprises at least one unit cell comprising a porous matrix impregnated with a given amount of a liquid electrolyte and a pair of a fuel electrodes and an air electrode, provided on one side and another side of the matrix, respectively, the impregnated liquid electrolyte is lost with increasing operating time due to its evaporation, etc., and the performance of the fuel cell is gradually deteriorated. Thus, it is necessary to supplement the matrix with the liquid electrolyte.

Heretofore, the following systems for supplementing the matrix with a liquid electrolyte, particularly liquid phosphoric acid, have been proposed.

Japanese Patent Application Kokai (Laid-open) No. 59-60973 discloses a system for supplying liquid phosphoric acid mist to a fuel gas supply line, and then supplying a mixture of fuel gas and the liquid electrolyte mist to a fuel electrode, thereby supplying the liquid electrolyte to the matrix, but fails to disclose a specific means for supplementing the matrix with the thus supplied liquid electrolyte.

Japanese Patent Application Kokai (Laid-open) No. 60-121680 discloses a fuel electrode provided with such pores or water non-repellent parts that can pass liquid phosphoric acid electrolyte mist to the matrix, and particularly a system for supplying 70-85 wt. % phosphoric acid mist together with a fuel gas to the matrix through the fuel gas grooves and the pores or water non-repellent parts of the fuel electrode layer while the fuel cell power generation is discontinued.

Japanese Patent Application Kokai (Laid-open) No. 60-151977 discloses a system for atomizing a liquid phosphoric acid electrolyte with a portion of fuel gas and supplying the atomized electrolyte, together with the fuel gas, to the matrix through a large number of pores provided through a fuel electrode.

Japanese Patent Application Kokai (Laid-open) No. 60-218770 discloses a system for injecting a liquid phosphoric acid electrolyte towards gas passage grooves in a stack of unit cells through an injecting nozzle provided at the side wall of the stack, thereby supplementing the matrix with the liquid phosphoric acid electrolyte through pores or hydrophilic (water nonrepellent) parts provided through the electrode layer, but it is difficult to efficiently inject the liquid phosphoric acid electrolyte into the grooves, and most of the liquid electrolyte deposits on the side wall of the stack and flows down along the side wall of the stack That is, it is difficult to uniformly supply the liquid electrolyte to the unit cells in this system. This is because the ratio of the opening area of the total grooves to the side wall area of the stack is very small, for example, about 10 to about 15:100.

Japanese Patent Application Kokai (Laid-open) No. 61-42870 discloses a system of supplying phosphoric acid electrolyte vapor to a fuel cell, as mixed with a gas to a fuel cell, recovering phosphoric acid from the effluent gas and recycling the recovered phosphoric acid.

Though the foregoing prior art discloses systems for supplying phosphoric acid electrolyte mist or vapor, together with a fuel gas, to gas flow passage grooves in the fuel electrode and supplementing the matrix with the electrolyte through pores or water nonrepellent parts provided in the fuel electrode, the particle size of liquid electrolyte mist (which will be hereinafter referred to as "mist sizes") and the system for trapping the liquid electrolyte mists are not taken into account at all in any of the foregoing prior art. When the mist size is larger, most of the mists deposits on the inside wall of a piping or manifold to the fuel cell stack or the side wall of the fuel cell stack, and it is difficult to supply the electrolyte to the fuel cell. When the mist size is smaller on the other hand, most of the mist passes through the gas flow passage of the fuel cell, and it is also difficult to supplement the matrix of the fuel cell with the liquid electrolyte.

That is, no consideration is given to the mist size and the system for trapping the electrolyte mist in any of the foregoing prior art, and there have been such problems as a poor mist trapping efficiency, deposition of liquid phosphoric acid electrolyte mist onto deposition-unwanted positions, and occurrence of short circuit on the stack side wall or corrosion of structural members due to the deposition of the liquid electrolyte mist.

SUMMARY OF THE INVENTION

An object of the present invention is to provide an electrolyte-type fuel cell having system for generating a liquid electrolyte mist of appropriate mist size, supplying the mist, together with a gas, to the gas flow passage of the electrode, trapping the electrolyte mist in the gas flow passage with a high trapping efficiency, and smoothly supplementing the matrix with the trapped liquid electrolyte.

Another object of the present invention is to provide an electrolyte-type fuel cell having a system for smoothly supplying a liquid electrolyte to the unit cells without depositing the liquid electrolyte onto the deposition-unwanted positions.

As a result of extensive studies of systems for supplying a liquid electrolyte to an electrolyte-type fuel cell, the present inventors have found that the matrix of an electrolyte-type fuel cell can be efficiently supplemented with a liquid electrolyte by providing a means for generating liquid electrolyte mist having an appropriate mist size on the gas supply side, thereby generating the liquid electrolyte mist, and providing a demister for trapping the mist in a gas flow passage of at least one of a pair of electrodes in the unit cell and on a liquid electrolyte passage communicating the gas flow passage with the matrix, and have established the present invention on the basis of this finding.

That is, the objects of the present invention can be attained by an electrolyte-type fuel cell, which comprises at least one unit cell comprising a matrix for retaining a liquid electrolyte and a pair of gas diffusible electrodes each having a gas flow passage and provided at both sides of the matrix and in direct contact with the matrix. A pair of gas supply-discharge means for supplying and discharging a necessary gas to and from the gas passages of the corresponding gas-diffusible electrodes of the unit cell, at least one of the gas passages of the gas-diffusible electrodes being communicated with the matrix through at least one liquid electrolyte passage. At least one demister being provided in the gas flow passage and on the liquid electrolyte passage exposed in the gas flow passage. A means for generating liquid electrolyte mist being provided on the supplying side of at least one of the gas supply-discharge means, and more particularly by an electrolyte-type fuel cell, which comprises at least one unit cell comprising a matrix for retaining a liquid electrolyte and a pair of a gas-diffusible fuel electrode having a fuel gas flow passage and a gas-diffusible oxidizing agent electrode having an oxidizing agent gas flow passage. A pair of a fuel gas supply-discharge means and an oxidizing agent gas supply-discharge means for supplying and discharging a fuel gas to the fuel gas flow passage of the fuel electrode of the unit cell and an oxidizing agent gas to the oxidizing agent gas flow passage of the oxidizing agent electrode of the unit cell, respectively. At least one of the gas flow passages in the fuel electrode and the oxidizing agent electrode being communicated with each other through at least one liquid electrolyte passage. At least one demister being provided in the gas flow passage and on the liquid electrolyte passage exposed in the gas flow passage, and a means for generating liquid electrolyte mist being provided on the supplying side of at least one of the gas supply-discharge means.

The liquid electrolyte for use in the present invention depends upon the types of fuel cell, and includes phosphoric acid, potassium hydroxide, lithium carbonate, and potassium carbonate. In the present invention, phosphoric acid is preferably used.

In the present invention, the means for generating liquid electrolyte mist is provided on the gas supplying side, for example, at any position in a gas supply piping or manifold to the unit cells, that is, on the fuel gas or oxidizing agent gas supply side to the unit cells. The means for generating liquid electrolyte mist for use in the present invention must be the one that can generate liquid electrolyte mist having mist sizes of 5 to 200 μm preferably 10 to 30 μm, for which a two-fluid nozzle type mist generator using a liquid electrolyte as one of the fluids and a gas as another fluid is suitable. In that case, the gas is preferably a fuel gas itself or an inert gas such as nitrogen gas, etc., and the nozzle may be in a double pipe structure to conduct cooling with a cooling medium such as water, etc. The cooling effective for protecting the nozzle from heat and acid can be readily carried out according to the known technique.

The liquid electrolyte mists must have a mist size of 5 to 200 μm, preferably 10 to 30 μm. Liquid electrolyte mist having much larger mist sizes can be more readily trapped, but are more liable to deposit onto deposition-unwanted parts such as the side wall of stack, whereas liquid electrolyte mists having much smaller mist sizes are less depositable onto the deposition-unwanted parts and more liable to enter the gas flow passage in the unit cells, but are more liable to pass through the gas flow passage without deposition on the inside walls of the gas flow passage, lowering the electrolyte supplying efficiency.

The present inventors found through tests that fine liquid electrolyte mists having mist sizes of not more than 200 μm or very fine mist having mist sizes of about 10 μm, were much less depositable onto the side wall, etc., and it was difficult to generate and trap the mist having mist sizes of less than 5 μm. According to a conventional atomizer, an inert gas, etc. is injected onto the liquid surface of liquid phosphoric acid from a nozzle to atomize the liquid phosphoric acid [Japanese Patent Application Kokai (Laid-open) No. 60-121680], where only larger mists having mist sizes of 300 μm or more were obtained. When liquid phosphoric acid mist generated according to the atomizer of such type at the necessary gas rate for the stationary power generation of the electrolyte-type fuel cell were supplied to a gas flow passage, that is, a plurality of parallel gas flow grooves without the demisters in a fuel cell, as shown in FIG. 2, 50 to 70% of the mist were deposited onto the inside walls of the piping and the manifold. When the liquid electrolyte mist having mist sizes of 10 to 30 μm were likewise supplied to the fuel cell, more than 90% of phosphoric acid electrolyte mist was led into the gas flow passage of the fuel cell and less than 10% of phosphoric acid was deposited on the inside wall. However, 50% of the phosphoric acid mist led into the gas flow passage passed therethrough, and only about 45% was effectively supplied to the matrix.

When porous carbon chips having pore sizes of 30 to 50 μm and a porosity of 98% were provided in the gas flow passage to choke the grooves, as shown in FIG. 2, so as to efficiently trap the liquid phosphoric acid electrolyte mist, it was found that 97% of the mist could be trapped.

In the present invention, it is necessary to provide the demisters at positions where the liquid electrolyte passage is provided through the gas-diffusible electrode to communicate the gas flow passage of the gas-diffusible electrode with the matrix retaining the liquid electrolyte, provided in contact with the gas-diffusible electrode, and it is not always necessary that the demisters completely choke the gas flow passage. That is, one feature of the present invention is to make a gas stream containing the liquid electrolyte mist hit the demisters, thereby trapping the mist by the demisters, and to supply the trapped mists to the matrix through the liquid electrolyte passage below and in contact with the demisters.

When the demisters 7 of the same height as that of ribs 12 forming gas flow grooves 13 are provided in the grooves 13 so as to choke the grooves 13, as shown in FIG. 2, most of the mist, that is, more than 90% of the mist were trapped through the demisters 13, while a portion of the mist deposited on the inside walls and a portion of the mist leaked through the demisters 13. That is, the liquid electrolyte mist can be readily trapped with a high trapping efficiency, whereas the pressure drop of the gas stream is increased. In order to overcome the pressure drop in that case, the gas stream containing the liquid electrolyte mist is made to hit the demisters to trap the mist, and then to change the flow direction of the gas stream, for example, by passing the gas stream through a by-pass provided just before the demister. In that case, the mist trapping efficiency is somewhat lowered, but the gas pressure drop is not increased. In any case, it is preferable to provide the demisters at an upstream side in the gas flow passage, because the liquid electrolyte mist carried by the gas stream are contained at a higher concentration at the upstream side and thus a higher mist trapping efficiency of the mist can be obtained.

In the present invention, the gas flow passage in at least one of a pair of the gas-diffusible electrodes in the unit cell is communicated with the matrix through at least one liquid electrolyte passage, and the liquid electrolyte passage may be in form of a pore or pores or preferably a pore or pores filled with the same material as that of the matrix, or in the form of a lyophilic layer of lyophilic material. The liquid electrolyte mist trapped by the demister provided on the liquid electrolyte passage are rapidly and smoothly supplied to the matrix Any material can be used for the demister, so far as it is porous and has smaller pore sizes, a high porosity, a good affinity toward the liquid electrolyte and no reactivity with the liquid electrolyte. For example, porous materials composed of SiC or carbon as the main component are preferable. When ribs that form the gas flow passage grooves are composed of a carbonaceous, porous material, the demister may be made of the same material as that of the ribs. In that case, ribs may be appropriately arranged in the gas flow passage, and the head ends of those ribs which the gas stream containing the liquid electrolyte mist can hit are to be located on the liquid electrolyte passage. The mist trapping efficiency will be somewhat lowered, but the fabrication of electrodes will be more facilitated.

Another feature of the present invention is to provide a means for generating liquid electrolyte mist having mist sizes of 5 to 200 $\mu$m at the gas supply side of a gas supply-discharge means, as mentioned before. When the generated liquid electrolyte mist have mist sizes of 5 to 200 $\mu$m, the mists can be efficiently led into the gas flow passage of the gas-diffusible electrode without deposition onto the deposition-unwanted parts such as side wall, etc. and trapped by the demisters provided in the gas flow passage and on the liquid electrolyte passage with a high mist trapping efficiency, and smoothly supplied to the matrix through the liquid electrolyte passage.

In an electrolyte-type fuel cell, air is usually used as an oxidizing agent gas, and its flow rate is several times as high as the necessary theoretical flow rate for the reaction, and when the air is also used for cooling the electrode, air must be supplied at a flow rate further several to several hundred times as high as the necessary theoretical flow rate. Thus, the liquid electrolyte is usually carried not by the oxidizing agent gas, but by a fuel gas, and thus the demisters are usually provided in the gas flow passage of the fuel electrode.

BRIEF DESCRIPTION OF THE DRAWINGS

FIG. 3 shows that the demisters are provided on the liquid electrolyte passage in the form of a lyophilic layer and FIG. 4 shows that the demisters are provided on the liquid electrolyte passage in the form of pores filled with the same material as that of matrix.

PREFERRED EMBODIMENTS OF THE INVENTION

The present invention will be described in detail below, referring to embodiments and the accompanying drawings.

Figure 1:
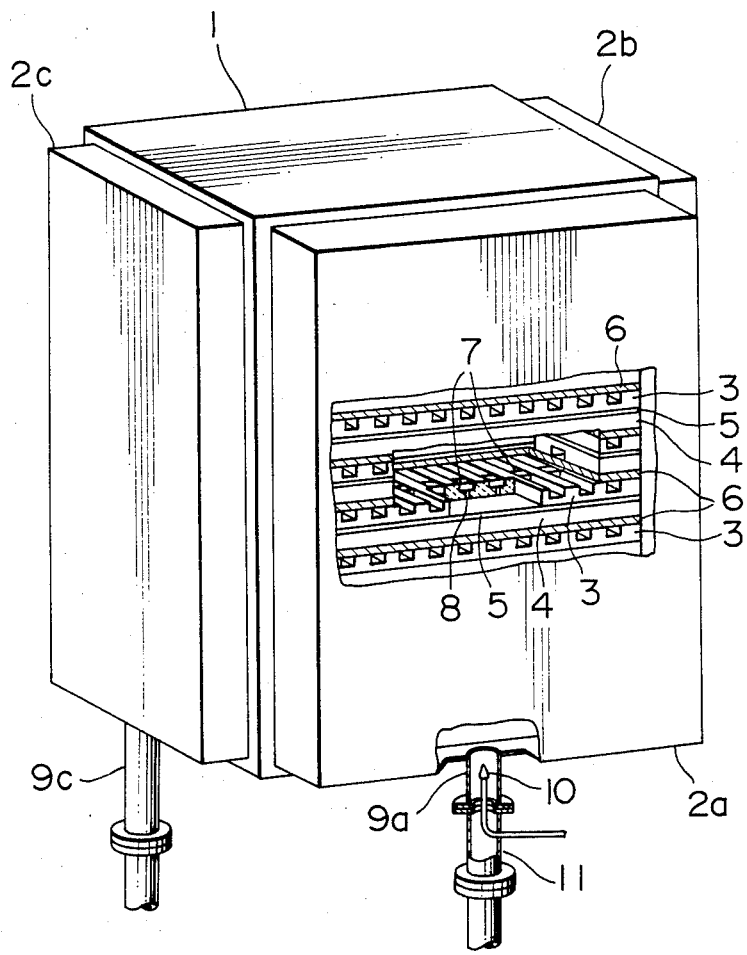
FIG. 1 is a partially cut-away, perspective view of a stack of unit cells in the entire structure according to the present invention.

FIG. 1 is a partially cut-away, perspective view of a fuel cell stack of the present invention, where a unit cell comprises a pair of a fuel electrode 3 and an air electrode 4 and a matrix 5 retaining phosphoric acid as a liquid electrolyte, provided between the fuel electrode 3 and the air electrode 4.

The unit cells are laid one upon another through separators 6 for separating the fuel from the air to constitute a stack 1. The stack 1 is provided with a fuel gas manifolds 2a and 2d (2d is not shown in the drawing) with a fuel gas inlet 9a and a fuel gas outlet 9d (9d is not shown in the drawing), respectively, and with air manifolds 2b and 2c with an air inlet 9c and an air outlet 9d (9d is not shown in the drawing), respectively. At the fuel gas inlet 9a to the manifold 2a on the fuel gas supply side, a jig provided with a nozzle 10 for generating phosphoric acid electrolyte mist is provided to supply the phosphoric acid mist, together with the fuel gas, to the manifold 2a.

Figure 2:
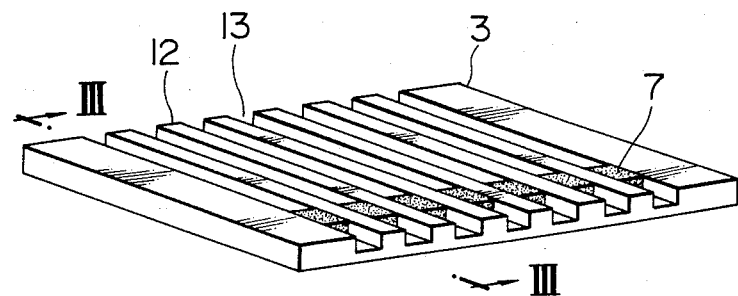
FIG. 2 is a perspective view of an electrode provided with demisters in the gas flow passage used in one unit cell in the stack of FIG. 1.

As shown in FIG. 2, porous carbon chips having pore sizes of 30 to 50 $\mu$m and a porosity of 98% are provided as demisters 7 in the gas flow passage grooves 13 of the fuel electrode 3 and on the liquid electrolyte passages in the form of pores communicating the grooves 13 to the matrix 5, as shown in FIG. 1, to choke the grooves 13.

As shown in FIG. 2, the demisters 7 are provided on the upstream side of the gas flow passage grooves 13 with the same height as that of ribs 12 forming the gas flow passage grooves 13 to choke the grooves 13.

Figure 3:
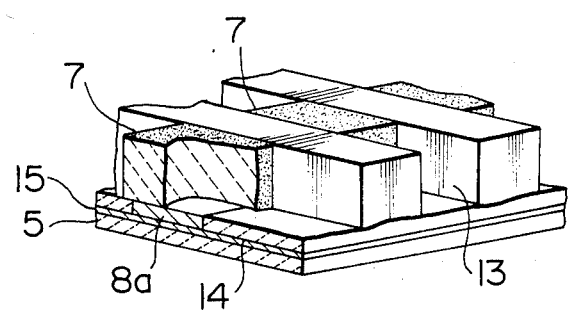
FIGS. 3 and 4 are cross-sectional, perspective views along the line III—III of FIG. 2, where
Figure 4:
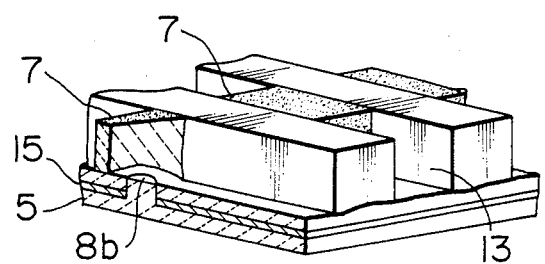

As shown in FIGS. 3 and 4, views along the line III—III of FIG. 2, the liquid electrolyte passage 8 of FIG. 3 is in the form of a lyophilic layer 8a formed in the web layer 14 on the side of catalyst layer 15 of electrode 3 without the water repellent treatment. The web layer 14 is usually subjected to a water repellent treatment such as a teflon treatment. Thus, the lyophilic layer can be readily formed through the web layer 14. The lyophilic layer 8a is formed in a band state traversing the gas flow passage grooves 13 and connecting the positions at which the demisters 7 are provided in the individual gas flow passage grooves 13.

FIG. 4 shows that the demisters 7 are provided on the liquid electrolyte passages in the form of pores 8b filled with the same material as that of the matrix.

With the structure of the fuel cell, phosphoric acid mist having mist sizes of 10 to 30 $\mu$m were supplied under the ordinary power generation condition, and it was found that 93% of the supplied mist was trapped, 5% was deposited on the inside wall, etc. and 2% was leaked through the gas flow passage grooves. Thus, in the foregoing embodiment of the present invention, the mist trapping efficiency was increased to 2.3 times as high as the conventional system without the demisters, and the deposition of mist onto the inside wall, etc. was reduced to about 1/10 or less.

Figure 5:
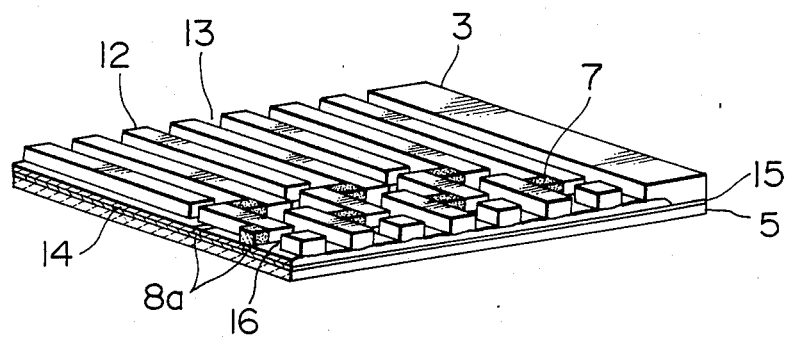
FIGS. 5 to 9 are perspective views of electrode structures according to other embodiments of the present invention.

In FIGS. 5 to 9, other embodiments of demister arrangements and changes in the direction of gas stream in the gas flow passage are shown. FIG. 5 shows an embodiment which reduces the increase in pressure drop by choking the gas flow passage grooves by demisters 7, as encountered in the embodiment of FIG. 2, where the difference from the embodiment of FIG. 2 is that the gas stream containing liquid electrolyte mists is made to hit the demisters 7 to trap the mists, and the gas stream stripped of the mists by the collision with the demisters is led into at least one of the adjacent gas flow passage grooves through a by-pass 16 provided in the rib at a position just before the demister 7 to be hit. The trapped liquid electrolyte mist are supplied to the matrix 5 through the lyophilic layer 8a as the liquid electrolyte passage communicating the gas flow passage groove 13, on which the demister 7 is provided, with the matrix 5.

In this embodiment, the mist trapping efficiency was about 20% reduced, that is, reduced to about 75%, but another effect of no increase in the pressure drop through the demisters was obtained.

Figure 6:
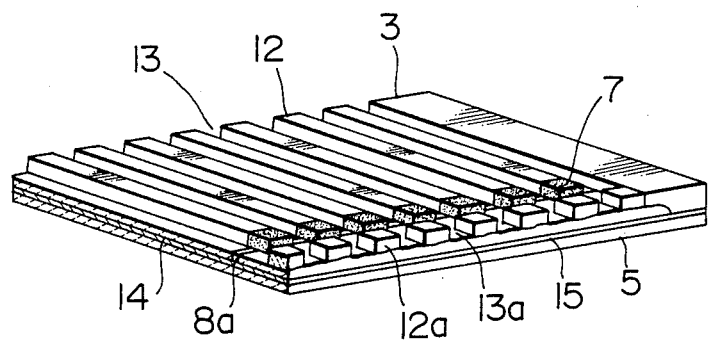
Figure 7:
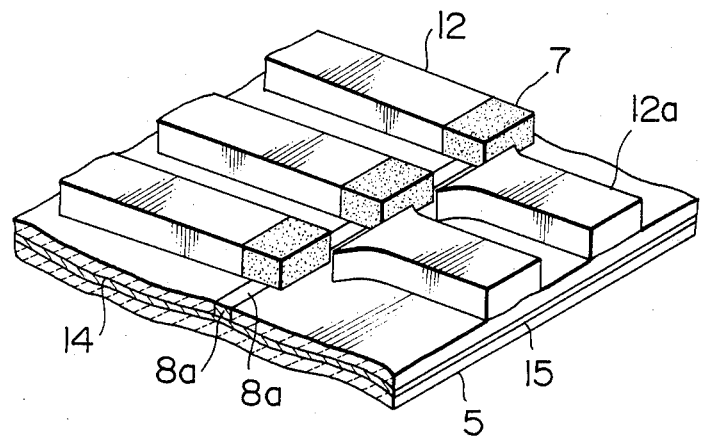

Embodiments shown in FIGS. 6 and 7 are to improve the mist trapping efficiency, as compared with the embodiment of FIG. 5, where guide chips 12a are provided at the gas inlet part and in a staggered position against the demisters 7 provided at the heads of the ribs to make the gas stream hit the demisters 7 and flow into the side grooves 13 at the demister 7 from the inlet groove 13a between the adjacent guide chips 12a. The gas stream can contact the demister 7 more efficiently.

An embodiment of FIG. 7 is to make the gas stream into a contracted stream by extending the tail ends of the guide chips 12a, thereby narrowing the gas flow passage grooves at the tail ends. The contact of the gas stream with the demisters 7 is further improved, as compared with the embodiment of FIG. 6. That is, it was found that the mist trapping efficiency was increased to 80% in the embodiment of FIG. 6, whereas it was further improved to 85-90% in the embodiment of FIG. 7. In both embodiments, no appreciable increase in the pressure drop was found.

Figure 8:
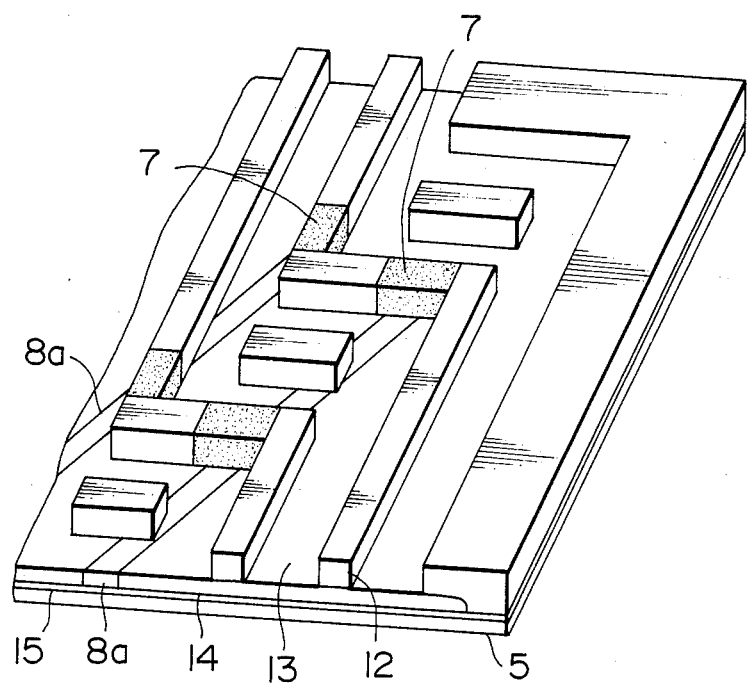

In FIG. 6, the width of the guide chips 12a can be made larger than that of the ribs 12 to narrow the inlet grooves 13a. Similar effect to that of the embodiment of FIG. 7 can be obtained thereby. An embodiment of FIG. 8 is to apply the demister to an electrode with a bent gas flow passage, where the demisters 7 are provided at the collision parts of the gas stream. According to this embodiment, the demisters 7 are almost evenly distributed all over the electrode surface, and thus the liquid electrolyte can be almost evenly supplied to the matrix surfaces through the liquid electrolyte passages provided as diagonal bands all over the electrode surface.

Figure 9:
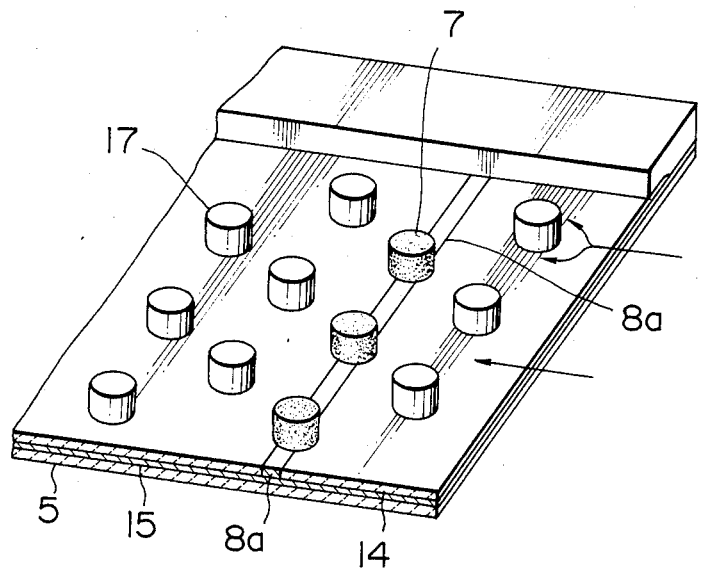

An embodiment of FIG. 9 is to apply the demisters to a unit cell with a zig-zag flow gas passage by means of round boss projections 17, where at least one row of the boss projections is provided on the liquid electrolyte passage in a band form as demisters 7. In this embodiment, the demisters 7 can be provided at any position on the liquid electrolyte passage in the direction of gas stream as indicated by arrow marks, and thus the liquid electrolyte can be more evenly and effectively supplied to the matrix.

In any of the foregoing embodiments, the demisters are provided on the liquid electrolyte passages, and the liquid electrolyte passages can be provided in the form of pores or in the form of lyophilic layers in any shape such as a band, dots, etc. in any direction or in a row or rows. In any of the foregoing embodiments using ribs, the demisters can be formed from the same material as that of the rib, if the ribs are made of porous carbon materials.

According to the present invention, a means for generating liquid electrolyte mist having appropriate mist sizes is provided in a piping or a manifold at the supply side of a gas supply-discharge means of a stack of unit cells and demisters having a high mist trapping efficiency are provided in the gas flow passages of unit cells and on the respective liquid electrolyte passages communicating the gas flow passage with the matrix, and thus the liquid electrolyte can be effectively and smoothly supplied to the matrix of the unit cell with a high mist trapping efficiency, e.g. twice that of the conventional system without demisters, with reduction in the amount of the mist carried away by the gas from the unit cells and without deposition onto the deposition-unwanted parts.

What is claimed is:

1. A fuel cell using a liquid electrolyte, which comprises at least one unit cell comprising a matrix for retaining a liquid electrolyte and a pair of gas diffusible electrodes each having a gas flow passage and provided at both sides of the matrix and in direct contact with the matrix, and a pair of gas supply-discharge means for supplying and discharging a necessary gas to and from the gas passages of the corresponding gas-diffusible electrodes of the unit cell, at least one of the gas passages of the gas-diffusible electrodes being communicated with the matrix through at least one liquid electrolyte passage, at least one demister being provided in the gas flow passage and on the liquid electrolyte passage exposed in the gas flow passage, and a means for generating liquid electrolyte mist being provided on the supplying side of at least one of the gas supply-discharge means.

2. A fuel cell using a liquid electrolyte according to claim 1, wherein the gas flow passage comprises a plurality of gas flow passage grooves formed through a plurality of ribs.

3. A fuel cell using a liquid electrolyte according to claim 1, wherein the gas flow passage comprises a plurality of gas flow passage grooves in parallel to one another formed through a plurality of ribs provided in parallel to one another.

4. A fuel cell using a liquid electrolyte according to claim 2 or 3, wherein at least one demister is provided in each of the gas flow passage grooves.

5. A fuel cell using a liquid electrolyte according to claim 4, wherein the gas flow passage grooves each provided with the demister are communicated with at least one of the adjacent gas flow passage grooves just before the demister of the first gas flow passage grooves.

6. A fuel cell using a liquid electrolyte according to claim 1, wherein the gas flow passage comprises a plurality of guide chips provided at the gas inlet part of the gas-diffusible electrode and a plurality of ribs provided in staggered positions against the guide chips.

7. A fuel cell using a liquid electrolyte according to claim 6, wherein the guide chips and the ribs are provided in parallel to one another, respectively.

8. A fuel cell using a liquid electrolyte according to claim 7, wherein the guide chips are extended in width at the tail ends, or larger in width than the ribs, thereby narrowing the gas flow passage grooves between the guide chips.

9. A fuel cell using a liquid electrolyte according to one of claims 6, 7 or 8, wherein the demisters are provided at head ends of the ribs, respectively.

10. A fuel cell using a liquid electrolyte according to claim 1, wherein the gas flow passage comprises a plurality of gas flow passages each having bent sections formed by a plurality of ribs each having corresponding bent sections.

11. A fuel cell using a liquid electrolyte according to claim 10, wherein the bent sections of the ribs that collide with a gas stream are each composed of the demister.

12. A fuel cell using a liquid electrolyte according to claim 1, wherein the gas flow passage is provided with a plurality of round boss-shaped projections, at least one row of which are provided on the liquid electrolyte passage.

13. A fuel cell using a liquid electrolyte according to claim 12, wherein the round boss-shaped projections provided on the liquid electrolyte passage are demisters.

14. A fuel cell using a liquid electrolyte according to claim 1, wherein the liquid electrolyte passage is a lyophilic layer.

15. A fuel cell using a liquid electrolyte according to claim 14, wherein the lyophilic layer is provided in the form of a band or bands.

16. A fuel cell using a liquid electrolyte according to claim 1, wherein the liquid electrolyte passage is in the form of a pore or pores.

17. A fuel cell using a liquid electrolyte according to claim 16, wherein the pore is or pores are filled with the same material as that of the matrix.

18. A fuel cell using a liquid electroltye according to claim 1, wherein the means for generating the liquid electrolyte mist is a generator of liquid electrolyte mist having mist sizes of 5 to 200 µm.

19. A fuel cell using a liquid electrolyte according to claim 1, wherein the means for generating the liquid electrolyte mist is a generator of liquid electrolyte mist having mist sizes of 10 to 30 µm.

20. A fuel cell using a liquid electrolyte according to claim 1, wherein the demister is composed of carbonaceous, porous material or a porous material composed of SiC as the main component.

21. A fuel cell using a liquid electrolyte according to claim 1, wherein the liquid electrolyte is phosphoric acid, potassium hydroxide, lithium carbonate or potassium carbonate.

22. A fuel cell, using a liquid electrolyte which comprises at least one unit cell comprising a matrix for retaining a liquid electrolyte and a pair of a gas-diffusible fuel electrodes having a fuel gas flow passage and a gas-diffusible oxidizing agent electrode having an oxidizing agent gas flow passage, and a pair of a fuel gas supply-discharge means and an oxidizing agent gas supply-discharge means for supplying and discharging a fuel gas to the fuel gas flow passage of the fuel electrode of the unit cell and an oxidizing agent gas to the oxidizing agent gas flow passage of the oxidizing agent electrode of the unit cell, respectively, at least one of the gas flow passages in the fuel electrode and the oxidizing agent electrode being communicated with each other through at least one liquid electrolyte passage, at least one demister being provided in the gas flow passage and on the liquid electrolyte passage exposed in the gas flow passage, and a means for generating liquid electrolyte mists being provided on the supplying side of at least one of the gas supply-discharge means.

23. A fuel cell using a liquid electrolyte according to claim 22, wherein the gas flow passage comprises a plurality of gas flow passage grooves formed through a plurality of ribs.

24. A fuel cell using a liquid electrolyte according to claim 22, wherein the gas flow passage comprises a plurality of gas flow passage grooves in parallel to one another formed through a plurality of ribs provided in parallel to one another.

25. A fuel cell using a liquid electrolyte according to claim 23 or 24, wherein at least one demister is provided in each of the gas flow passage grooves.

26. A fuel cell using a liquid electrolyte according to claim 25, wherein the gas flow passage grooves each provided with the deminister are communicated with at least one of the adjacent gas flow passage grooves just before the demister of the first gas flow passage grooves.

27. A fuel cell using a liquid electrolyte according to claim 22, wherein the gas flow passage comprises a plurality of guide chips provided at the gas inlet part of the gas-diffusible electrode and a plurality of ribs provided in staggered positions against the guide chips.

28. A fuel cell using a liquid electrolyte according to claim 27, wherein the guide chips and the ribs are provided in parallel to one another, respectively.

29. A fuel cell using a liquid electrolyte according to claim 28, wherein the guide chips are extended in width at the tail ends, or larger in width than ribs, thereby narrowing the gas flow passage grooves between the guide chips.

30. A fuel cell using a liquid electrolyte according to any one of claims 27, 28 and 29, wherein the demisters are provided at head ends of the ribs, respectively.

31. A fuel cell according to claim 22, wherein the gas flow passage comprises a plurality of gas flow passages each having bent sections formed by a plurality of ribs each having corresponding bent sections.

32. A fuel cell using a liquid electrolyte according to claim 31, wherein the bent sections of the ribs that collide with a gas stream are each composed of the demister.

33. A fuel cell using a liquid electrolyte according to claim 22, wherein the gas flow passage are provided with a plurality of round boss-shaped projections, at least one row of which are provided on the liquid electrolyte passage.

34. A fuel cell using a liquid electrolyte according to claim 33, wherein the round boss-shaped projections provided on the liquid electrolyte passage are demisters.

35. A fuel cell using a liquid electrolyte according to claim 22, wherein the liquid electrolyte passage is a lyophilic layer.

36. A fuel cell using a liquid electrolyte according to claim 35, wherein the lyophilic layer is provided in the form of a band or bands.

37. A fuel cell using a liquid electrolyte according to claim 22, wherein the liquid electrolyte passage is in the form of a pore or pores.

38. A fuel cell using a liquid electrolyte according to claim 37, wherein the pore is or pores are filled with the same material as that of the matrix.

39. A fuel cell using a liquid electrolyte according to claim 22, wherein the means for generating the liquid electrolyte mist is a generator of liquid electrolyte mist having mist sizes of 5 to 200 µm.

40. A fuel cell using a liquid electrolyte according to claim 22, wherein the means for generating the liquid electrolyte mist is a generator of liquid electrolyte mist having mist sizes of 10 to 30 µm.

41. A fuel cell using a liquid electrolyte according to claim 22, wherein the demister is composed of carbonaceous, porous material or a porous material composed of SiC as the main component.

42. A fuel cell using a liquid electrolyte according to claim 22, wherein the liquid electrolyte is phosphoric acid, potassium hydroxide, lithium carbonate or potassium carbonate.

43. A fuel cell using a liquid electrolyte according to claim 22, wherein the liquid electrolyte is phosphoric acid.

44. A fuel cell using a liquid electrolyte according to claim 1, wherein the liquid electrolyte is phosphoric acid.

* * * * *